Nov. 29, 1966  E. BENDER  3,288,517
CAR TOP CAMPER

Filed June 2, 1964  2 Sheets-Sheet 1

INVENTOR
Emmanuel Bender

INVENTOR
Emmanuel Bender

United States Patent Office 3,288,517
Patented Nov. 29, 1966

3,288,517
CAR TOP CAMPER
Emmanuel Bender, 8742 French St., Apt. B, Vancouver,
British Columbia, Canada
Filed June 2, 1964, Ser. No. 371,912
1 Claim. (Cl. 296—23)

This invention relates to mobile homes and more particularly to a camper adapted to be carried on a car top and supported at the floor level by means of braces attached to a car frame.

Broadly, the invention comprises a set of tubular braces or support attached to a car frame, a camper carrying male tubular framing adapted to register within said first mentioned tubular framing, said last mentioned tubes carried underneath the floor of the camper and a fully equipped cabin style camper mounted on said tubing and sleeping quarters integrally formed therewith and carried over the roof of a vehicle.

As in conventional type trailers the camper is provided with a fully equipped kitchen, cupboard facilities, stoves, etc.

The weight of the camper is evenly spread over the roof of the automobile while the kitchen portion is supported by the tubing which is secured to the frame of the vehicle.

The camper does not interfere with the operation or manipulation of the car in any way, even when turning sharp corners.

Any vehicle such as a big luxury car, standard, station wagon, truck up to 1 ton, carrying the said camper, may be parked at any parking meter, because the overall length of the vehicle is not unduly increased. In the case of a compact or foreign-made car carrying the camper, the length remains shorter than that of a standard size vehicle. The burden of extra weight is not extreme, since the camper weighs approximately 400 lbs. The L-shaped camper is especially designed to fit over car-top or truck, in a way that does not interfere with the use of the truck box. A door is built behind the steps to give access to the car trunk-compartment.

The invention also provides for a detachable rod which scopic front stand which may be used as a supporting post when the camper is dismounted from the automobile.

The invention also provides a detachable rod which may be used as a supporting post when the camper is dismounted from the automobile.

The primary object of the invention is the provision of a camper which is light and compact, easy to transport and which does not decrease the facility to operate a vehicle to which the said camper is attached.

Another important object is the provision of a compact camper as set forth which is fully equipped with kitchen facilities such as stove, ice box, sink, working counter, kitchen cabinets for storing dishes, dressers, clothes closet space, and sleeping accommodations.

Still another object is the provision of a light durable camper which is strong and easy to transport and which is provided with an extension which is telescoped in when travelling and withdrawn when in use.

With these and other objects in view that may appear as the description proceeds the invention consists in the novel arrangement of co-operating elements as hereinafter more specifically set forth, claimed and shown in the accompanying drawings forming part of this application and in which:

Figure 1:
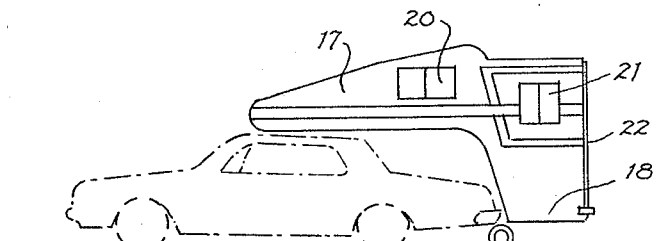
FIGURE 1 is a side elevational view of an automobile shown in chain dotted line and the camper secured thereto.

Referring more in detail to the drawings in which the similar reference characters designate corresponding parts throughout the several views, it will be seen the invention comprises an automobile having a framework. On the framework is secured a pair of tubular supporting members 10 which are secured in position by means of straps 11 attached to the framework by conventional means. Each of said tubular members is provided with a plurality of anchoring apertures 12 through which the camper supporting frame is secured.

The camper, per se, comprises tubular frame members 13 adapted to register telescopically within the tubular members 10. The said members 13 are also provided with securing apertures which line up with the apertures 12 of the framing members 10 to secure the device in position. To raise the lower extremity of the camper at approximately bumper height the framing members 13 are bent upwardly at 14 and bent back again in a horizontal position. A pair of straps 15 are secured to said members 13 at the front end and at the rear end to brace said members in parallel relation to each other and the floor 16 of the camper is secured to said straps.

As in conventional trailers, the camper is provided with side walls and a roof and the accommodations normally associated with trailers and like mobile homes.

In order to carry the camper on the roof of an automobile, the sleeping accommodation 17 is stepped up from the floor level 18 and a step ladder (not shown in the drawings) is provided to enable users of the device to easily reach the bed 19 of the camper. Ventilation in the sleeping area is provided by means of a window 20 disposed on each side of the camper, and ventilation is provided in the kitchen area by means of windows 21 disposed on each side of the said kitchen. The front end of the sleeping accommodation may be attached to the rain moulding of the roof of the automobile by conventional clamps.

Figure 2:
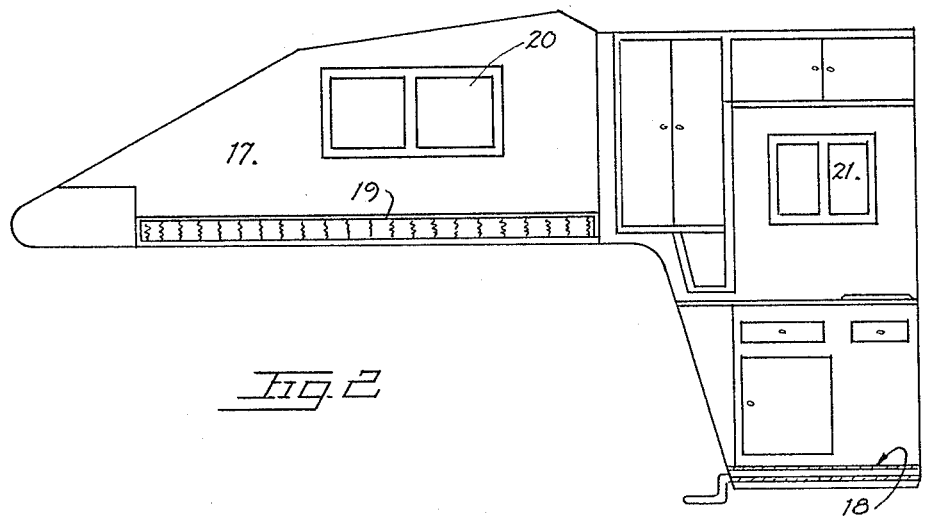
FIGURE 2 is an elevational sectional view through the camper showing some of the facilities provided therein and the double floor providing the space wherein the extension telescopes.
Figure 3:
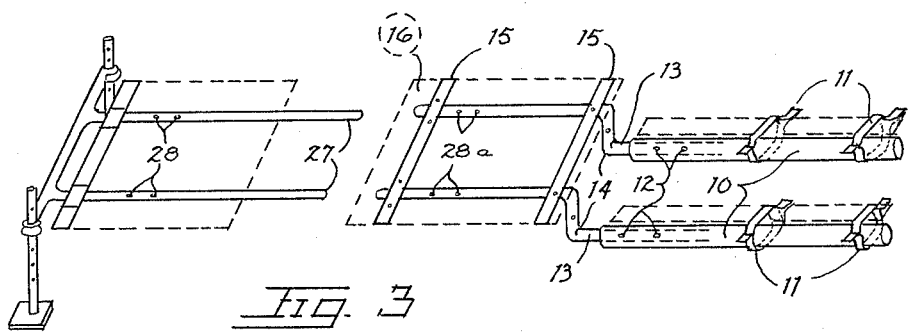
FIGURE 3 is an exploded view of the framework on which the camper is carried.
Figure 4:
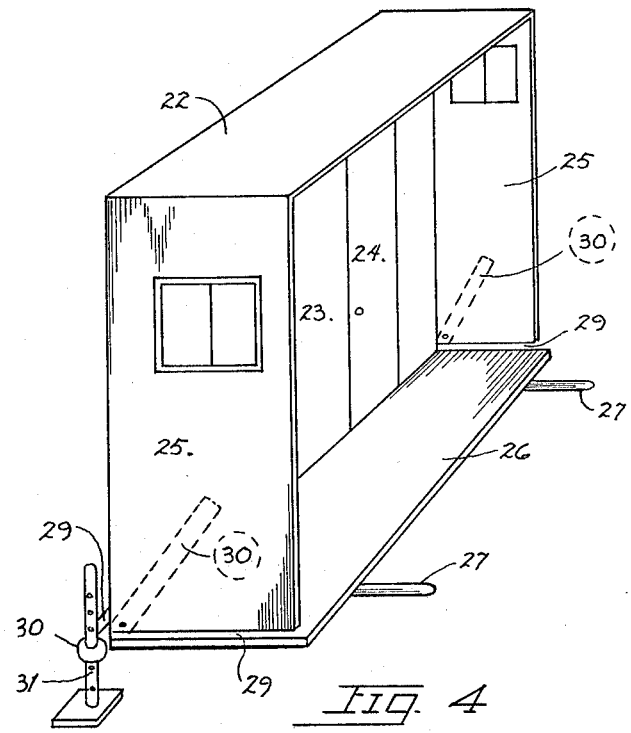
FIGURE 4 is a perspective view of the extension.

As illustrated in FIGURE 2 of the accompanying drawings the kitchen is provided with normal kitchen facilities such as cupboards, counter top, stove, built in the counter top with gas tank located in the counter directly below the surface unit.

In order to maintain the unit as compact as possible and to provide additional habitable sheltered area, the L shaped camper is formed with an extension 22 which telescopically engages within the kitchen wall and floor on the exterior side of the kitchen wall and floor.

The extension 22 comprises a rear wall 23 provided with a door 24, side walls 25 and a floor 26. A supporting frame similarly constructed to the frame of the camper is formed of tubular members 27 which are spaced apart to register within the tubular frame members 13 of the camper. A plurality of apertures 28 are provided to register with apertures 28a to securely lock the extension in telescopic engagement within the camper. A bumper 29 is secured to the rear wall of the extension and is provided with a loop 30 at each extremity through which is engaged a supporting post 31. As shown in the drawing the post 31 is adjustable to compensate with uneven terrain on which the camper may be set up. The front end of the camper is supported above the terrain by conventional jacks.

Figure 5:
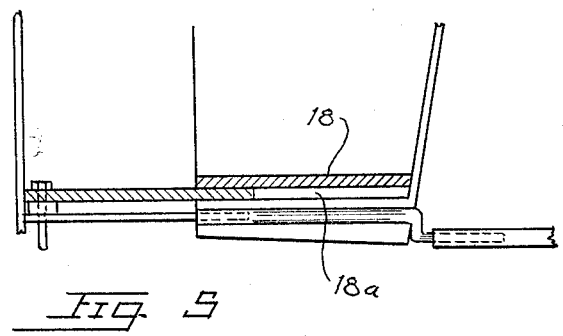
FIGURE 5 is a detailed view of the floor construction within which the extension telescopes when the camper is being transported; as shown, the extension is pulled out to provide a larger living accommodation.

As shown in FIGURE 5, the floor 18 of the camper is double and is provided with a space 18a within which the floor 26 of the extension will telescope when the device is being transported. The side walls telescope within the camper area so that the extension completely disappears from view when the camper is being transported.

When the extension is withdrawn an opening 29 between the floor and the lower end of the side walls is sealed by means of a hinged weather strip 30' secured in each corner of said extension.

It is believed that the construction and advantages have been fully set forth and that further detailed description is not required.

While the preferred embodiment has been disclosed it is to be understood that minor modifications may be resorted to without departing from the spirit of the invention and the scope of the claim.

The embodiments of the invention in which an exclusive property or privilege is claimed are defined as follows.

I claim:

A camper for attachment to a motor vehicle comprising an L-shaped hollow body mounted on the vehicle so that one portion extends longitudinally of the roof to form a sleeping compartment and the other portion extends vertically of the rear end of the vehicle to form a kitchen compartment, said kitchen compartment having a section extendable rearwardly, a pair of spaced parallel tubular members secured to the frame of the vehicle adjacent the bottom of the kitchen compartment, a second pair of tubular members secured to the bottom of the kitchen compartment and projecting therefrom for telescopic engagement with said first pair of tubular members, a third pair of tubular members secured to the bottom of said extensible section of said kitchen compartment for telescopic engagement with said second pair of tubular members, a bumper secured to the rear wall of said extensible section having a loop at each end and adjustable vertical posts disposed in the loops of said bumper for supporting the extensible section when extended.

References Cited by the Examiner
UNITED STATES PATENTS

| | | | |
|---|---|---|---|
| D. 192,795 | 5/1962 | Sloat | 296—23 X |
| 1,427,749 | 8/1922 | Leech | 296—23 |
| 2,729,499 | 1/1956 | Eggum | 296—26 |
| 2,893,780 | 7/1959 | Ernine. | |
| 3,123,393 | 3/1964 | Markwick | 296—23 |

BENJAMIN HERSH, *Primary Examiner.*

P. GOODMAN, *Assistant Examiner.*